United States Patent [19]

Plank

[11] Patent Number: 5,504,061
[45] Date of Patent: Apr. 2, 1996

[54] DRILLING FLUID COMPOSITION AND PROCESS FOR THE FILTRATE REDUCTION OF DRILLING FLUID COMPOSITIONS CONTAINING MIXED METAL HYDROXIDES

[75] Inventor: Johann Plank, Trostberg, Germany

[73] Assignee: SKW Trostberg Aktiengesellschaft, Trostberg, Germany

[21] Appl. No.: 98,359

[22] PCT Filed: Dec. 16, 1992

[86] PCT No.: PCT/EP92/02920

§ 371 Date: Nov. 12, 1993

§ 102(e) Date: Nov. 12, 1993

[87] PCT Pub. No.: WO93/12194

PCT Pub. Date: Jun. 24, 1993

[30] Foreign Application Priority Data

Dec. 17, 1991 [DE] Germany .......................... 41 41 605.8

[51] Int. Cl.$^6$ ...................................... C09K 7/02
[52] U.S. Cl. ........................... 507/110; 507/111; 507/113
[58] Field of Search .................................... 507/110, 111, 507/113

[56] References Cited

U.S. PATENT DOCUMENTS 4,652,384  3/1987  Francis et al. .
4,990,268  2/1991  Burba, III et al. .

OTHER PUBLICATIONS

Gray et al, "Composition and Properties of Oil Well Drilling Fluids" 4th ed., Houston, Gulf Publishing, 1980, pp. 548–552.

Primary Examiner—Philip Tucker
Attorney, Agent, or Firm—Felfe & Lynch

[57] ABSTRACT

In order to reduce the filtrate of aqueous drilling fluid compositions based on clay minerals containing mixed metal hydroxides, a polysaccharide that is partially etherified with hydroxyethyl and/or hydroxypropyl groups is used as the filtrate-reducing agent.

21 Claims, No Drawings

DRILLING FLUID COMPOSITION AND PROCESS FOR THE FILTRATE REDUCTION OF DRILLING FLUID COMPOSITIONS CONTAINING MIXED METAL HYDROXIDES

This application is a 371 of PCT/EP 92/02920 filed Dec. 16, 1992.

So-called drilling fluids (drilling fluid compositions) which can be constructed either on a water basis or on an oil basis are used in boring oil wells and gas wells. A clay mineral is usually added to the so-called water based fluids as a viscosifying agent. Clay minerals which are frequently used for this are bentonite or attapulgite. A disadvantage of such clay-water fluids is that the so-called plastic viscosity of the drilling fluid is very high at the clay concentration required to achieve an adequate lifting capability of the drill cuttings. It is known that a high plastic viscosity slows down the drilling progress and thus has to be regarded as unfavourable.

An additive based on a mixed metal hydroxide is known from the U.S. Pat. No. 4,664,843 which eliminates the aforementioned disadvantages of aqueous bentonite suspensions. There is still a problem with drilling fluids treated with the mixed metal hydroxide in that this fluid exhibits an unusual behaviour with the anionic filtrate reducers which are usually used in drilling fluids. This means that depending on the respective dosage, anionic filtrate reducers either substantially thin the drilling fluid (i.e. the viscosity breaks down) or lead to an undesired increase in the plastic viscosity. Similar effects occur, although not to the same extent, when common non-ionic filtrate reducers are used such as e.g. starch or guar gum. Since control over the filtrate properties of a drilling fluid is an essential prerequisite for its successful use, this therefore leads to a major limitation in the use of a drilling fluid based on mixed metal hydroxides.

The object of the present invention is therefore to develop a drilling fluid composition and a process for drilling fluid compositions containing mixed metal hydroxides which does not have the said disadvantages of the state of the art but rather has good filtrate-reducing properties and at the same time does not substantially change the special rheological properties of this fluid composition.

This object is achieved according to the present invention in that a polysaccharide that is partially etherified with hydroxyethyl and/or hydroxypropyl groups is used as a filtrate reducing agent. It surprisingly turned out that the non-ionic filtrate-reducing agents used according to the present invention do not have a major effect on the viscosity of fluids admixed with mixed metal hydroxides although the usual non-ionic additives have this undesired property.

In the process of the invention, drilling fluid compositions based on mixed metal hydroxides such as those known from U.S. Pat. No. 4,664,843 are used. An essential feature of the present invention is that a polysaccharide that is partially etherified with hydroxyethyl and/or hydroxypropyl groups is used as a filtrate reducing agent in which in particular starch, locust bean gum, guar gum or cellulose come into consideration as the polysaccharide. The polysaccharide can be used for the etherification in an unsubstituted or substituted form in which OH groups which are still free must be present for the etherification. Derivatives with carboxymethyl groups and a degree of substitution of <0.2 are used as preferred substituted basic polysaccharides into which the hydroxyethyl or/and hydroxypropylether groups are introduced.

It has proven to be particularly advantageous when the partially etherified polysaccharides have a degree of etherification of 0.02 to 2.5, preferably 0.1 to 1.2 because then the advantages achieved according to the present invention are particularly pronounced. In this connection the degree of etherification is understood as the average number of hydroxyethyl or hydroxypropyl groups bound to a glucose unit. The filtrate-reducing agents used according to the present invention and their production are known from the literature. Thus in particular hydroxypropyl starch is described in U.S. Pat. No. 4,003,838, hydroxypropyl guar in U.S. Pat. No. 4,025,443, hydroxyethyl and hydroxypropyl cellulose is described in U.S. Pat. No. 2,572,039 and carboxymethyl-hydroxyethyl cellulose is described in U.S. Pat. Nos. 2,618,595 and in 3,284,353. These agents are usually produced by reacting the appropriate basic polysaccharides with ethylene oxide or propylene oxide (cf. "Starch and its Derivatives" 4th edition, J. A. Radley, Chapman and Hall Ltd. London 1968).

According to a preferred embodiment of the present invention, the partially etherified polysaccharides can in addition have further cationic or anionic substituents with a degree of substitution of <0.2 wherein in particular, ammonium and quarternary ammonium groups of the formula

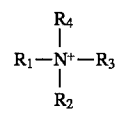

may be used as cationic substituents in which $R_1$, $R_2$, $R_3$, $R_4$=H or denote a $C_1$ to $C_4$ alkyl radical (cf. for example U.S. Pat. No. 4,003,883). Carboxymethyl groups are to be regarded as particularly preferred anionic substituents which are usually produced by reacting the corresponding alkalipretreated polysaccharides with chloroacetic acid.

This secondary substitution may under certain circumstances lead to advantageous effects. Thus for example in the case of starch it is known that the introduction of carboxymethyl groups protects the polymer against bacterial degradation and contributes to an improvement of the dispersibility of the agent in the drilling fluid. The limitation of the degree of secondary substitution to <0.2 is a consequence of the fact that when the proportion of anionic or cationic groups is higher there is a reoccurrence of the undesired effect that the present invention eliminates on the rheology of the fluids treated with mixed metal hydroxides. Finally it is also possible, for example in order to increase the thermostability, to cross-link the starch whereby di- or trifunctional compounds such as e.g. $POCl_3$, cyanuric chloride or epichlorohydrin can be used according to U.S. Pat. No. 4,652,384 as cross-linkers.

The drilling fluid compositions based on mixed metal hydroxides produced according to the process according to the present invention which contain an amount of filtrate-reducing agent of 0.1 to 7% by weight, preferably of 1 to 3% by weight in relation to the total weight of the drilling fluid are distinguished firstly by good filtrate-reducing properties and secondly by their minor influence, i.e. which is acceptable for drilling purposes, on the rheology of the fluid.

It is intended to further elucidate the present invention by the following examples.

EXAMPLES

Drilling fluid composition:

| | |
|---|---|
| 350 ml | distilled water |
| 7 g | Wyoming-Bentonite (e.g. "Gold Seal", from Baroid Company, Houston/USA) |
| 24 h | stirring |
| 0.7 g | mixed metal hydroxide (e.g. "POLYVIS" from the SKW Trostberg AG Company, Germany) of the formula $([Mg\ Al\ (OH)_{4.7}]_{3.33}\ Cl)_n$ | adjust pH value with anhydrous soda to 10.5 mix for 30 minutes on a "Hamilton Beach Mixer" set at low speed add filtrate-reducer mix for 15 minutes on a "Hamilton Beach Mixer" set at low speed The properties of the fluid are determined according to the regulations of the American Petroleum Institute (API) following guideline RP 13 B-I (see Table).

The following properties were determined:

Rheology of the fluid composition measured with the FANN viscometer described in the API guideline at 600, 300, 200, 100, 6 and 3 revolutions per minute.

PV=plastic viscosity of the fluid, calculated according to API RP 13 B-I

YP=Yield Point of the fluid, calculated according to API RP 13 B-I

Gel strengths of the fluid after 10 seconds and 10 minutes, measured using the FANN viscometer according to API RP 13 B-I API-FL=fluid loss of the fluid after 30 minutes at 7 bar differential pressure and room temperature, determined according to API RP 13 B-I As the experiments show only the products according to the present invention have virtually no influence on the rheology of the fluid admixed with the mixed metal hydroxide and at the same time exhibit the desired decrease of the filtrate value.

polysaccharide from the group comprising a partially etherified starch, locust bean gum, guar gum or cellulose is used.

3. The process of claim 2, wherein the partially etherified polysaccharide is not further substituted.

4. The process of claim 2, wherein the partially etherified polysaccharide is substituted with carboxymethyl groups and with a degree of substitution of carboxymethyl groups of <0.2.

5. The process of claim 1, wherein the degree of etherification is 0.1 to 1.2.

6. The process of claim 1, wherein a partially etherified polysaccharide is used which has still further cationic or anionic substituents with a degree of substitution of <0.2.

7. The process of claim 6, wherein the cationic substituent is of the formula

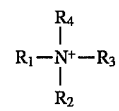

in which $R_1$, $R_2$, $R_3$, $R_4$=H or denote $C_1$ to $C_4$ alkyl groups.

8. The process of claim 6, wherein carboxymethyl groups are present as anionic substituents.

9. The process of claim 1, wherein the polysaccharide comprises a starch in a cross-linked form.

10. The process of claim 9, wherein a starch cross-linked with $POCl_3$, cyanuric chloride or epichlorohydrin is used.

TABLE

| Filtrate-reducing agent | Dosage % by weight | Fluid properties | | | |
|---|---|---|---|---|---|
| | | PV | YP lb/100 ft | gel strengths 10"/10' | API-FL ml |
| BLW | — | 5 | 55 | 25/26 | 38 |
| 1) State of the art | | | | | |
| a) non-ionic products | | | | | |
| starch (potato) | 2.0 | 22 | 102 | 61/64 | 5.4 |
| starch (maize) | 2.0 | 24 | 88 | 49/59 | 5.7 |
| guar gum | 2.0 | 38 | 60 | 31/36 | 6.2 |
| locust bean gum | 2.0 | 45 | 97 | 40/93 | 5.9 |
| b) anionic products | | | | | |
| CM cellulose (DS = 0.85) | 0.3 | 6 | 6 | 3/3 | 17.0 |
| CM cellulose (DS = 0.85) | 2.0 | 37 | 43 | 12/26 | 5.0 |
| vinylsulfonate/vinylamide-copolymer | 0.3 | 9 | 12 | 5/13 | 13.0 |
| vinylsulfonate/vinylamide-copolymer | 2.0 | 40 | 54 | 11/24 | 4.8 |
| 2) Products according to the present invention | | | | | |
| HP starch DS = 0.4 | 2.0 | 7 | 56 | 28/29 | 4.5 |
| HE cellulose DS = 1.9 | 2.0 | 8 | 51 | 20/28 | 4.8 |
| HP guar DS = 0.5 | 2.0 | 4 | 48 | 20/24 | 5.3 |
| CMHP starch (DS for CM = 0.1, DS for HP = 0.8) | 2.0 | 10 | 43 | 20/26 | 5.7 |

HP = hydroxypropyl
HE = hydroxyethyl
CM = carboxymethyl
DS = degree of etherification

I claim:

1. A process of reducing filtrate of an aqueous drilling fluid composition based on clay minerals containing mixed metal hydroxides comprising adding a filtrate reducing agent to the composition, the filtrate reducing agent comprising a polysaccharide that is partially etherified with hydroxyethyl and/or hydroxypropyl groups and has a degree of etherification of 0.02 to 2.5.

2. The process of claim 1, wherein a partially etherified

11. An aqueous drilling fluid composition based on clay minerals with an addition of mixed metal hydroxides and further comprising as a filtrate-reducing agent a polysaccharide that is partially etherified with hydroxyethyl and/or hydroxypropyl groups and has a degree of etherification of 0.02 to 2.5.

12. The drilling fluid composition of claim 11, wherein the amount of partially etherified polysaccharide present is 0.1 to 7% by weight in relation to the total weight of the drilling fluid.

13. The drilling fluid composition of claim 11 wherein the amount of partially etherified polysaccharide present is 1 to 3% by weight.

14. The drilling fluid composition of claim 11 wherein a partially etherified polysaccharide from the group comprising a partially etherified starch, locust bean gum, guar gum or cellulose is used.

15. The drilling fluid composition of claim 11 wherein the partially etherified polysaccharide is not further substituted.

16. The drilling fluid composition of claim 11 wherein the partially etherified polysaccharide is substituted with carboxymethyl groups and with a degree of substitution of carboxymethyl groups of <0.2.

17. The drilling fluid composition of claim 11 wherein the degree of etherification is 0.1 to 1.2.

18. The drilling fluid composition of claim 11 wherein partially etherified polysaccharides are used which have still further cationic or anionic substituents with a degree of substitution of <0.2.

19. The drilling fluid composition of claim 11 wherein the cationic substituent is of the formula

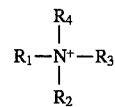

in which $R_1$, $R_2$, $R_3$, $R_4$=H or denote $C_1$ to $C_4$ alkyl groups.

20. The drilling fluid composition of claim 11 wherein carboxymethyl groups are present as anionic substituents.

21. The drilling fluid composition of claim 11 wherein the polysaccharide comprises a starch in a cross-linked form.

* * * * *